United States Patent
Peterson et al.

(10) Patent No.: US 11,988,386 B2
(45) Date of Patent: May 21, 2024

(54) GAS TURBINE ENGINE INJECTOR MODULE WITH THERMALLY COUPLED FUEL LINES HAVING RESPECTIVE OUTLETS

(71) Applicant: HONEYWELL INTERNATIONAL INC., Charlotte, NC (US)

(72) Inventors: Duane Peterson, Phoenix, AZ (US); Girish Kanakagiri, Bangalore (IN); Jaydeep Basani, Bangalore (IN); Nagaraja Rudrapatna, Phoenix, AZ (US); Paul Yankowich, Phoenix, AZ (US); Richard R. Bohman, Phoenix, AZ (US); Rodolphe Dudebout, Phoenix, AZ (US); Venkatesha Prasad, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/457,441

(22) Filed: Dec. 3, 2021

(65) Prior Publication Data
US 2023/0175696 A1    Jun. 8, 2023

(51) Int. Cl.
| | | |
|---|---|---|
| F23R 3/28 | (2006.01) | |
| F02C 7/22 | (2006.01) | |
| F02C 9/40 | (2006.01) | |
| F02C 9/44 | (2006.01) | |
| F23R 3/34 | (2006.01) | |
| F23R 3/36 | (2006.01) | |

(52) U.S. Cl.
CPC ............... *F23R 3/283* (2013.01); *F02C 7/22* (2013.01); *F02C 9/40* (2013.01); *F02C 9/44* (2013.01); *F23R 3/346* (2013.01); *F23R 3/36* (2013.01); *F05D 2270/31* (2013.01)

(58) Field of Classification Search
CPC .... F23R 3/283; F23R 3/46; F23R 3/36; F23R 3/40; F23R 3/44; F23R 3/346; F05D 2270/31; F02C 7/222
See application file for complete search history.

(56) References Cited

U.S. PATENT DOCUMENTS

| | | | | |
|---|---|---|---|---|
| 3,159,971 | A | * 12/1964 | Moebius | .................. F23R 3/283 |
| | | | | 285/136.1 |
| 4,735,044 | A | * 4/1988 | Richey | ...................... F02C 7/22 |
| | | | | 60/742 |
| 4,854,127 | A | 8/1989 | Vinson et al. | |
| 7,513,116 | B2 | 4/2009 | Hebert et al. | |

(Continued)

*Primary Examiner* — Katheryn A Malatek
*Assistant Examiner* — Jingchen Liu
(74) *Attorney, Agent, or Firm* — Lorenz & Kopf LLP (57) ABSTRACT

An injector module includes an injector stem that extends along an injector longitudinal axis between an inlet end and an outlet end of the injector module. The injector module also includes a first fuel line of a first fuel circuit at least partly extending through the injector stem. The first fuel line has a first outlet disposed at the outlet end of the injector stem. The injector module further includes a second fuel line of a second fuel circuit at least partly extending through the injector stem. The second fuel line has a second outlet disposed at the outlet end of the injector stem. The first outlet and the second outlet are spaced apart and have different orientations relative to the injector longitudinal axis. The first fuel line is thermally coupled to the second fuel line.

16 Claims, 7 Drawing Sheets

(56) References Cited

U.S. PATENT DOCUMENTS

| | | | |
|---|---|---|---|
| 7,624,576 B2 | 12/2009 | Alkabie et al. | |
| 8,353,163 B2* | 1/2013 | Smith | F23D 11/36 |
| | | | 239/397.5 |
| 9,347,667 B2 | 5/2016 | Dabat et al. | |
| 9,625,156 B2* | 4/2017 | Rudrapatna | B22F 10/28 |
| 10,378,446 B2* | 8/2019 | Caples | F02C 7/222 |
| 10,488,047 B2 | 11/2019 | Ott et al. | |
| 10,527,287 B2 | 1/2020 | Taliercio et al. | |
| 10,753,614 B2* | 8/2020 | Garry | F23R 3/283 |
| 10,816,207 B2 | 10/2020 | Fryer | |
| 11,460,191 B2* | 10/2022 | Berry | F23R 3/283 |
| 2011/0079013 A1 | 4/2011 | Mehring | |
| 2013/0305726 A1* | 11/2013 | Carrere | F23R 3/14 |
| | | | 60/746 |
| 2014/0090394 A1 | 4/2014 | Low et al. | |
| 2017/0261209 A9 | 9/2017 | Ginessin et al. | |
| 2019/0032559 A1 | 1/2019 | Dai et al. | |
| 2019/0063754 A1* | 2/2019 | Dudebout | F23R 3/06 |
| 2020/0072469 A1 | 3/2020 | Theuer et al. | |

\* cited by examiner

GAS TURBINE ENGINE INJECTOR MODULE WITH THERMALLY COUPLED FUEL LINES HAVING RESPECTIVE OUTLETS

TECHNICAL FIELD

The present disclosure generally relates to a gas turbine engine injector module and, more particularly, relates to a gas turbine engine injector module with thermally coupled fuel lines having respective outlets.

BACKGROUND

A gas turbine engine may be used to power aircraft or various other types of vehicles or systems. Such engines typically include: a compressor that receives and compresses incoming gas such as air; a combustor in which the compressed gas is mixed with fuel and burned to produce high-pressure, high-velocity exhaust gas; and one or more turbines that extract energy from the exhaust gas exiting the combustor.

There is an increasing desire to reduce combustion by-product emissions, particularly oxides of nitrogen (NOx), carbon monoxide (CO), and particulates, which may form during the combustion process. Combustion is typically achieved in a combustion chamber over a range of operating conditions. As a result, combustors operate under a variety of pressures, temperatures, and mass flows. These factors change with power requirements and environmental conditions. Controlling the various forms of combustion by-products over the range of operating conditions, thus, provides a number of challenges.

As such, it is desirable to provide improved combustion systems in gas turbine engines. It is also desirable to provide an injector module for a combustor that provides effective combustion across a number of different operating conditions and that also reduces emissions of NOx and other combustion by-products. Moreover, it is desirable to provide an injector module that is more robust and maintains effective and efficient fuel injection in a number of different operating conditions. It is also desirable to provide an injector module that is highly manufacturable at reduced costs. Moreover, it is desirable to provide an injector module that provides fuel injection control in a cost-effective manner. Furthermore, other desirable features and characteristics of the present disclosure will become apparent from the subsequent detailed description and the appended claims, taken in conjunction with the accompanying drawings and this background of the present disclosure.

BRIEF SUMMARY

In one embodiment, an injector module for a combustion section of a gas turbine engine is disclosed. The injector module includes an injector stem that extends along an injector longitudinal axis between an inlet end and an outlet end of the injector module. The injector module also includes a first fuel line of a first fuel circuit at least partly extending through the injector stem. The first fuel line has a first outlet disposed at the outlet end of the injector stem. The injector module further includes a second fuel line of a second fuel circuit at least partly extending through the injector stem. The second fuel line has a second outlet disposed at the outlet end of the injector stem. The first outlet and the second outlet are spaced apart and have different orientations relative to the injector longitudinal axis. The first fuel line is thermally coupled to the second fuel line.

In another embodiment, a method of operating an injector module for a combustion section of a gas turbine engine is disclosed. The method includes providing the injector module, wherein the injector module includes an injector stem that extends along an injector longitudinal axis between an inlet end and an outlet end of the injector module. The injector module also includes a first fuel line of a first fuel circuit at least partly extending through the injector stem. The first fuel line has a first outlet disposed at the outlet end of the injector stem. The injector module also includes a second fuel line of a second fuel circuit at least partly extending through the injector stem. The second fuel line has a second outlet disposed at the outlet end of the injector stem. The first outlet has a first orientation relative to the injector longitudinal axis and the second outlet is spaced apart at a second orientation relative to the injector longitudinal axis. The first fuel line is at least partly wrapped about and thermally coupled to the second fuel line. The method also includes controlling selectively, with a control system of the gas turbine engine, fuel injection by at least one of the first fuel circuit and the second fuel circuit. Moreover, the method includes cooling of the second fuel line by the first fuel line during the fuel injection by the at least one of the first fuel circuit and the second fuel circuit.

In yet another embodiment, a gas turbine engine is disclosed with a combustion section. The combustion section may include a combustion chamber that extends about an engine axis of the gas turbine engine. The combustion chamber has an upstream end and a downstream end that are separated along the axis. The gas turbine engine also includes an injector module for the combustion section. The injector module includes an injector stem that extends along an injector longitudinal axis between an inlet end and an outlet end of the injector module. The injector module also includes a first fuel line of a first fuel circuit that at least partly extends through the injector stem. The first fuel line has a first outlet disposed at the outlet end of the injector stem. The injector module also includes a second fuel line of a second fuel circuit that at least partly extends through the injector stem. The second fuel line has a second outlet disposed at the outlet end of the injector stem. The first outlet is directed in a tangential direction within the combustion chamber relative to the engine axis, and the second outlet is directed in a longitudinal, rearward direction within the combustion chamber along the engine axis and toward the downstream end. The gas turbine engine also includes a control system configured to selectively control injection into the combustion chamber from the injector module via at least one of the first fuel circuit and the second fuel circuit according to a detected operating parameter of the gas turbine engine to thereby inject more fuel from the first fuel circuit than the second fuel circuit. The first fuel line wraps about the second fuel line to thermally couple as a heat sink to the second fuel line.

Furthermore, other desirable features and characteristics of the present disclosure will become apparent from the subsequent detailed description and the appended claims, taken in conjunction with the accompanying drawings and the preceding background.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, an improved injector module for a gas turbine engine is disclosed according to example embodiments of the present disclosure. The exemplary embodiments discussed herein provide a combustion system and methods of combustion for a gas turbine engine that achieve effective and efficient combustion over a range of operating conditions. The injector module may provide desirable reductions in emissions.

The injector module may include a plurality of fuel outlets to a combustion chamber within the engine. A control system may also be included that selectively controls the outlets independently, for example, based upon certain engine operating conditions (i.e., according to detected operating parameters). Accordingly, emissions may be advantageously reduced.

Also, there may be individual fuel lines that are routed through the injector module to their respective outlets. These fuel lines may be thermally coupled. As such, fuel in one line may provide cooling for the fuel in the other line. The injector module may also include a cooling jacket, a shroud, etc. for further thermal benefits. Accordingly, the injector module may operate across a wide range of operating conditions while maintaining high efficiency, low emissions, and other advantages. Related methods of operating the injector module are also disclosed.

Moreover, methods of manufacturing the injector module are disclosed. For example, in some embodiments, one or more parts of the injector module may be unitary and monolithic, which may increase manufacturing efficiency. Furthermore, in some embodiments, one or more parts may be additively manufactured layer-by-layer to further improve manufacturability.

Figure 1:
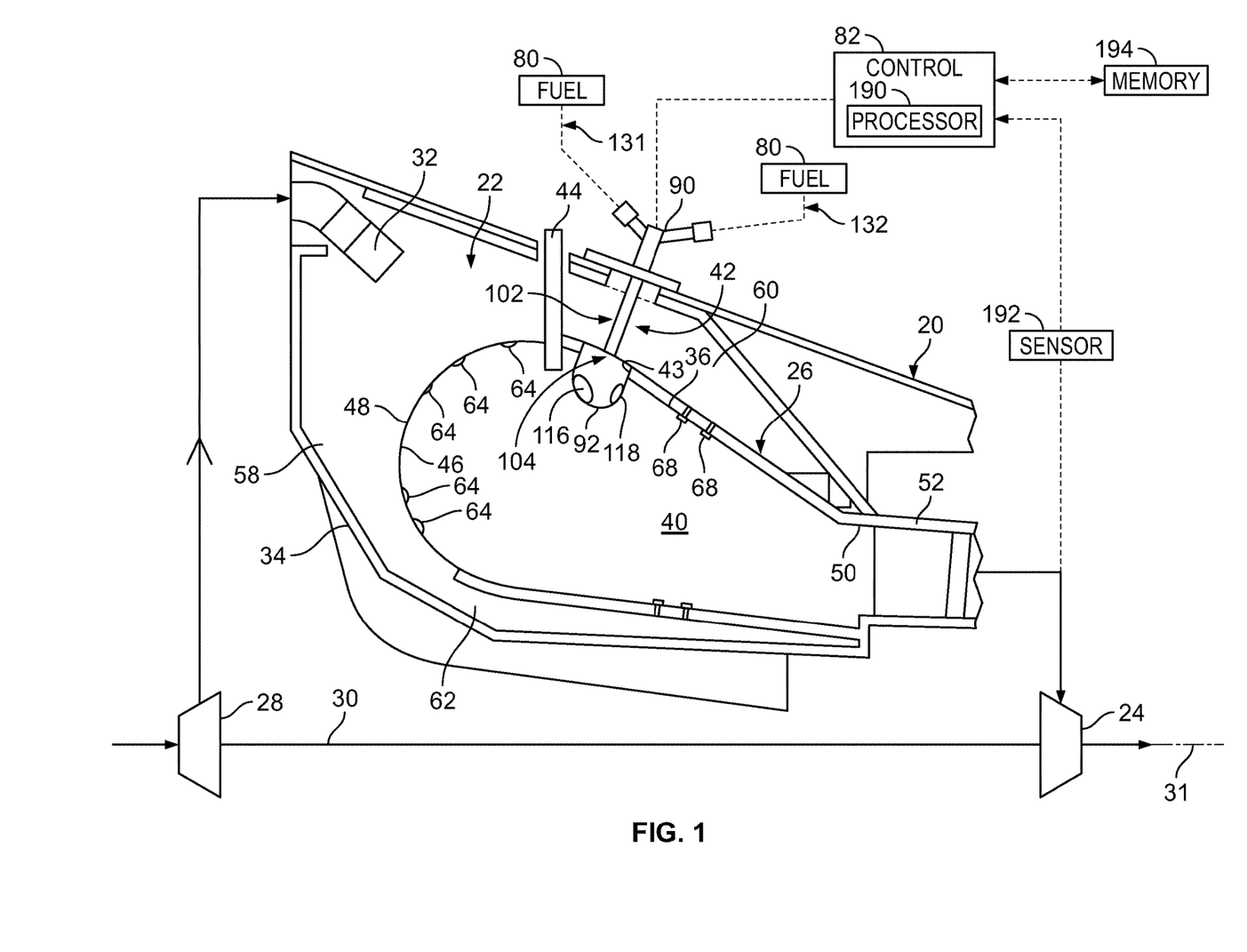
FIG. 1 is a schematic view of a gas turbine engine according to example embodiments of the present disclosure.

FIG. 1 is a cross-sectional view of a combustor area of an engine 20 showing a combustion system 22 in accordance with exemplary embodiments of the present disclosure. As shown, the engine 20 may be a turbofan type of gas turbine engine, with a turbine wheel 24 that achieves mechanical energy from combustion of air and fuel in a combustor 26. The combustor 26 mixes admitted air with fuel and ignites the resulting mixture to generate high energy combustion gases that are then directed to the turbine wheel 24. The mechanical energy from the turbine wheel 24 may be used to drive a compressor wheel 28, which may be embodied in the form of a ducted fan driven by the turbine wheel 24 through a shaft 30. The shaft 30 defines an axis 31 around which the compressor wheel 28 and the turbine wheel 24 rotate. The compressor wheel 28 may pressurize air for use in the combustor 26 and generally accelerate air through the engine 20, which may contribute to thrust.

Air may be delivered from the compressor wheel 28 to the combustor 26 through an air discharge 32. From there, compressed air may be discharged into the combustor's case 34. The case 34 may define an expanding diffuser 58 that leads to a liner 36. Combustion may be contained within the liner 36. The combustor 26 may be an annular type, with the liner 36 and the case 34 encircling the shaft 30. Accordingly, the liner 36 may define a single annular shaped combustion chamber 40 that extends around the axis 31. In some embodiments, the liner 36 may include a dome 46 at its upstream end 48. The liner 36 may gradually narrow as it extends further in the downstream direction, and the liner 36 may terminate at an exhaust opening 50 at its downstream end 52.

The engine 20 may also include an injector module 42 with an inlet end 90 and an outlet end 92. The injector module 42 may extend into the case 34, and the outlet end 92 may be received within the liner 36 via an injector opening 43. As such, the outlet end 92 may be disposed in the combustion chamber 40. The inlet end 90 may be disposed outside the case 34 and may be fluidly connected to at least one fuel source 80 (a fuel tank) to receive fuel therefrom. (Although multiple fuel sources 80 are illustrated in FIG. 1, there may be a single, common fuel source 80 in some embodiments.) The injector module 42 may inject this fuel into the chamber 40 via the outlet end 92 as will be discussed. Although only one injector module 42 is shown in FIG. 1, it will be appreciated that a plurality of injector modules may be disposed about the axis 31 and angularly spaced about the annular combustion chamber 40. In some embodiments, the number of injector modules 42 may be sixteen (16), although the number may be different in different configurations of the engine 20.

During operation, air from the compressor wheel 28 may be supplied into the case 34 via the air discharger 32. The introduced air may flow between the case 34 and the liner 36 through an outer air plenum 60 and an inner air plenum 62. From these plenums 60, 62, the air may enter the combustion chamber 40 through the injector opening 43 (and openings in the injector module 42 to be discussed), through effusion cooling holes 64 distributed across the liner 36, and/or through one or more quench jets 68. In some embodiments, the relative contributions of admitted air may include a majority of the air entering the combustion chamber 40 through the injector opening 43, with the quench jets 68 providing the second largest inflow, followed by the effusion cooling holes 64. The injector module 42 may selectively inject fuel into the chamber 40. Also, an igniter 44 may be included, which ignites the air/fuel mixture within the chamber 40 for drivingly rotating the turbine wheel 24.

The engine 20 may additionally include a control system 82. The control system 82 may include a processor 190, a computerized memory device 194, sensors 192, and/or other related components. The injector module 42 may be operatively connected to the control system 82 such that the control system 82 selectively controls injection of fuel into the chamber 40 as will be discussed in greater detail below.

Figure 2:
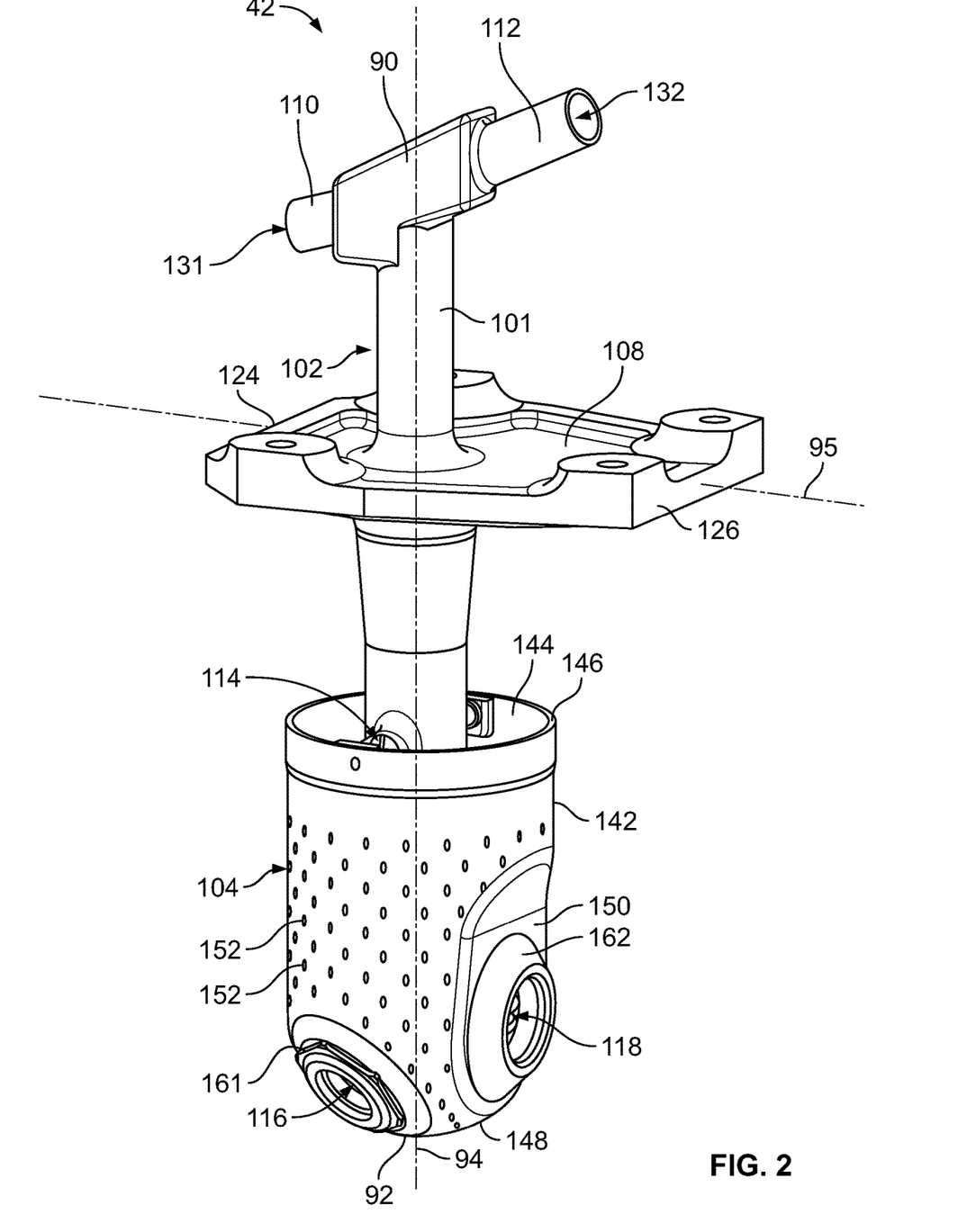
FIG. 2 is a perspective view of an injector module of the gas turbine engine of FIG. 1 according to example embodiments of the present disclosure.
Figure 3:
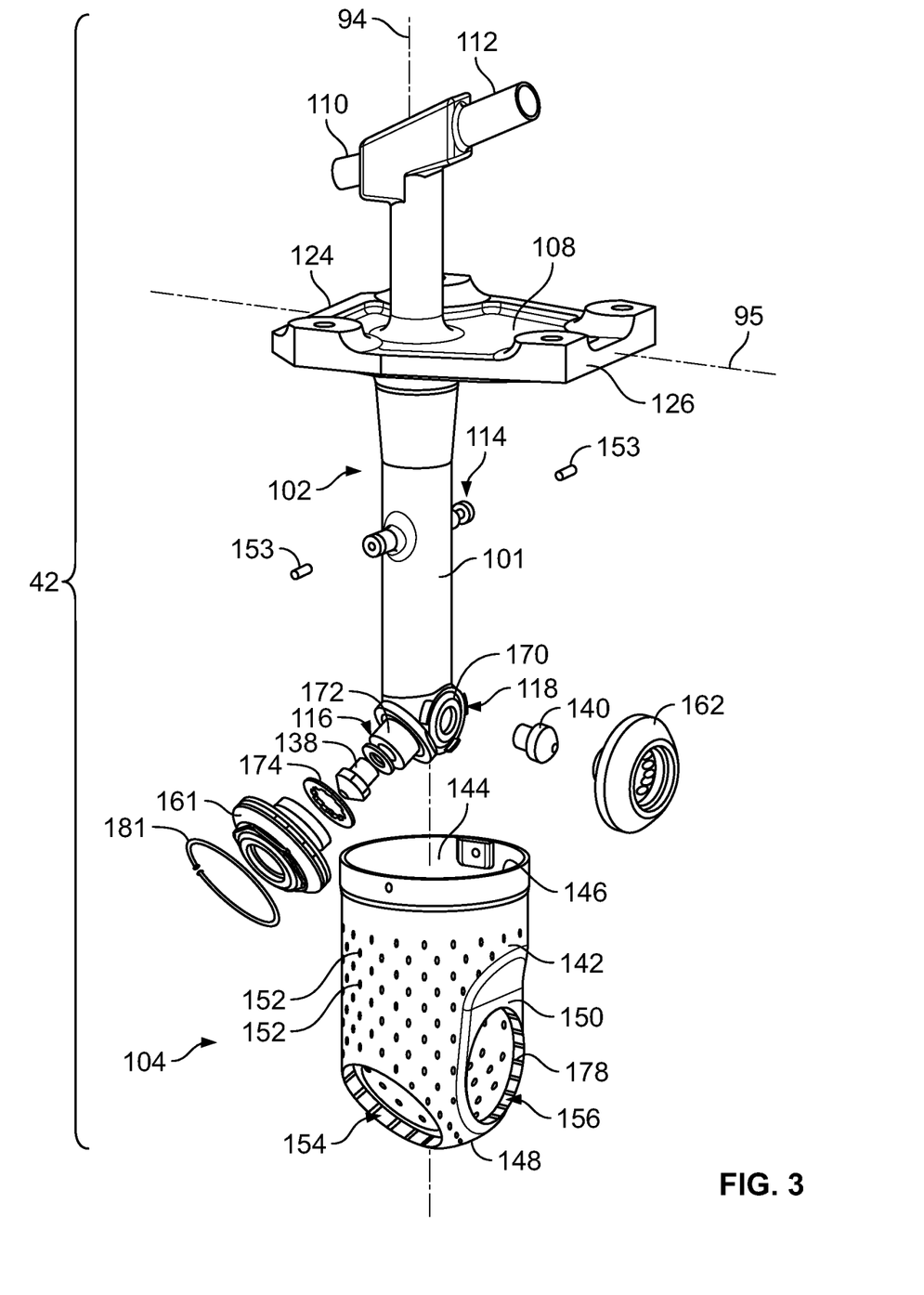
FIG. 3 is an exploded perspective view of the injector module of FIG. 2.

Referring to FIGS. 2 and 3, the injector module 42 will be discussed in greater detail according to example embodiments of the present disclosure. As mentioned above, the injector module 42 may include an inlet end 90 and an outlet end 92. The injector module 42 may be elongate and may extend generally along an injector longitudinal axis 94 between the inlet end 90 and the outlet end 92. The injector module 42 may also define an injector transverse axis 95, which may be normal to the injector longitudinal axis 94, which may intersect the axis 94, and which may extend between a forward side 124 and an aft side 126 of the injector module 42. As shown, the injector module 42 may generally include an injector stem 102 and an injector shroud 104 as well as other fittings and components that will be discussed in detail below.

As shown in FIG. 3, the injector stem 102 may be elongate and may extend along the injector longitudinal axis 94. The injector stem 102 may also include an exterior surface 101. In some embodiments, a majority of the exterior surface 101 may be cylindrical with a circular cross section taken normal to the injector longitudinal axis 94. At the outlet end 92, the exterior surface 101 may be bulbous, rounded, and generally semi-spherical.

Also, in some embodiments, the injector stem 102 may be made out of a metallic material. In some embodiments, the injector stem 102 may be a unitary, one-piece, monolithic member.

The injector stem 102 may be formed in a variety of ways without departing from the scope of the present disclosure. In some embodiments, the injector stem 102 may be additively manufactured layer-by-layer in an additive manufacturing system (e.g., a direct metal laser sintering (DMLS) system). Accordingly, the injector stem 102 may be manufactured conveniently and efficiently despite including complex features described in detail below. It will also be appreciated that the stem 102 may be formed via casting processes, may be assembled from a plurality of parts, etc. without departing from the scope of the present disclosure.

The injector stem 102 may include a first inlet branch 110 and a second inlet branch 112 at the inlet end 90. The first and second inlet branches 110, 112 may be hollow and tubular. The first inlet branch 110 may extend from the inlet end 90, for example, in a direction that is substantially parallel to the transverse axis 95 and may extend in a forward direction from the forward side 124. The second inlet branch 112 may extend from the inlet end 90 and may be directed at an angle but generally along the transverse axis 95 in a rearward direction from the aft side 126. The first inlet branch 110 and the second inlet branch 112 may be coupled to the fuel source 80 (FIG. 1) via a fluid connector (not shown), or there may be a continuous connection between the inlet branches 110, 112 and the fuel source(s) 80.

Moving further along the injector longitudinal axis 94 away from the inlet end 90, the injector stem 102 may include a flange 108. The flange 108 may be relatively flat, plate-like, and thin. The flange 108 may project substantially perpendicular to the injector longitudinal axis 94. The outboard corners of the flange 108 may collectively define a bolt pattern for fixedly attaching the stem 102 to the combustor case 34 as shown in FIG. 1.

Furthermore, the injector stem 102 may include a shroud support structure 114. The shroud support structure 114 may include at least one projection that projects outward radially from the axis 94. As shown, the shroud support structure 114 may include two rounded, cylindrical projections (i.e., arms) that project in an outboard direction from opposite sides of the axis 94. The shroud support structure 114 may be attached to the shroud 104 to connect the shroud 104 to the stem 102 as will be discussed in more detail below.

As shown in FIG. 3, the injector stem 102 may further include a first stem outlet 116 and a second stem outlet 118 at the outlet end 92 of the injector module 42. The first stem outlet 116 and the second stem outlet 118 may include respective apertures that are spaced apart angularly about the injector longitudinal axis 94 to have different orientations relative to the axis 94. The second stem outlet 118 (i.e., the axis of the outlet 118) may be directed substantially normal to the injector longitudinal axis 94 (e.g., directed substantially along the axis 95 and away from the aft side 126) whereas the first stem outlet 116 may be canted away at an angle relative to the axis 94 and the axis 95.

Furthermore, the flange 108 may be fixedly attached to the exterior of the case 34 as shown in FIG. 1, and the outlet end 92 may be received within the liner 36 with the second stem outlet 118 directed generally rearward along the engine longitudinal axis 31 toward the downstream end 52 of the chamber 40. The injector transverse axis 95 may be disposed at a slight angle relative to the engine longitudinal axis 31; however, the second stem outlet 118 may be directed substantially rearward along the engine longitudinal axis 31. As such, the second stem outlet 118 may provide axially directed fuel injection in the downstream direction relative to the axis 31 and relative to flow through the chamber 40.

In contrast, the first stem outlet 116 may be directed substantially tangentially with respect to the axis 31. In some embodiment, the first stem outlet 116 may be directed slightly in the forward-facing direction with respect to the axis 31 and primarily tangentially with respect to an imaginary circle that is centered on and normal to the axis 31. As such, the first stem outlet 116 may provide tangentially-directed fuel injection into the chamber 40 relative to the axis 31.

As shown in FIG. 3, the first stem outlet 116 may be fitted with a first nozzle member 138, and the second stem outlet 118 may be fitted with a second nozzle member 140. The nozzle members 138, 140 may atomize and discharge fuel into the chamber 40.

The stem 102 may additionally include a first fuel line 121 and a second fuel line 122 (FIG. 6) that extend internally through the stem 102 between the inlet end 90 and the outlet end 92. The first fuel line 121 may fluidly connect the first inlet branch 110 to the first stem outlet 116, and the second fuel line 122 may fluidly connect the second inlet branch 112 to the second stem outlet 118. The first fuel line 121 may be referred to as a so-called "pilot fuel line," and the second fuel line 122 may be referred to as a so-called "main fuel line" in some embodiments. Also, in some embodiments, the first fuel line 121 may have a smaller cross sectional area than the second fuel line 122.

As represented in FIG. 1, the injector module 42 may define at least part of a first fuel circuit 131 of the engine 20. Using the first fuel circuit 131, fuel may flow from the source 80, through the stem 102 via the first fuel line 121, and out of the stem 102 into the chamber 40 via the first stem outlet 116. Also, the injector module 42 may define at least part of a second fuel circuit 132, wherein fuel may flow from the source 80, through the stem 102 via the second fuel line 122, and out of the stem 102 via the second stem outlet 118.

As will be discussed, the control system 82 may selectively and independently control fuel injection via the first fuel circuit 131 and the second fuel circuit 132. Thus, the control system 82 may operate the injector module 42 in a manner that provides environmental benefits (e.g., reduced emissions, etc.)

Additionally, the first fuel line 121 and the second fuel line 122 may be thermally coupled within the stem 102. Accordingly, heat in one line 121, 122 may transfer to the other to provide cooling. Because of this heat transfer, fuel in the lines 121, 122 may be less prone to coking or other problems associated with overheating.

Figure 4:
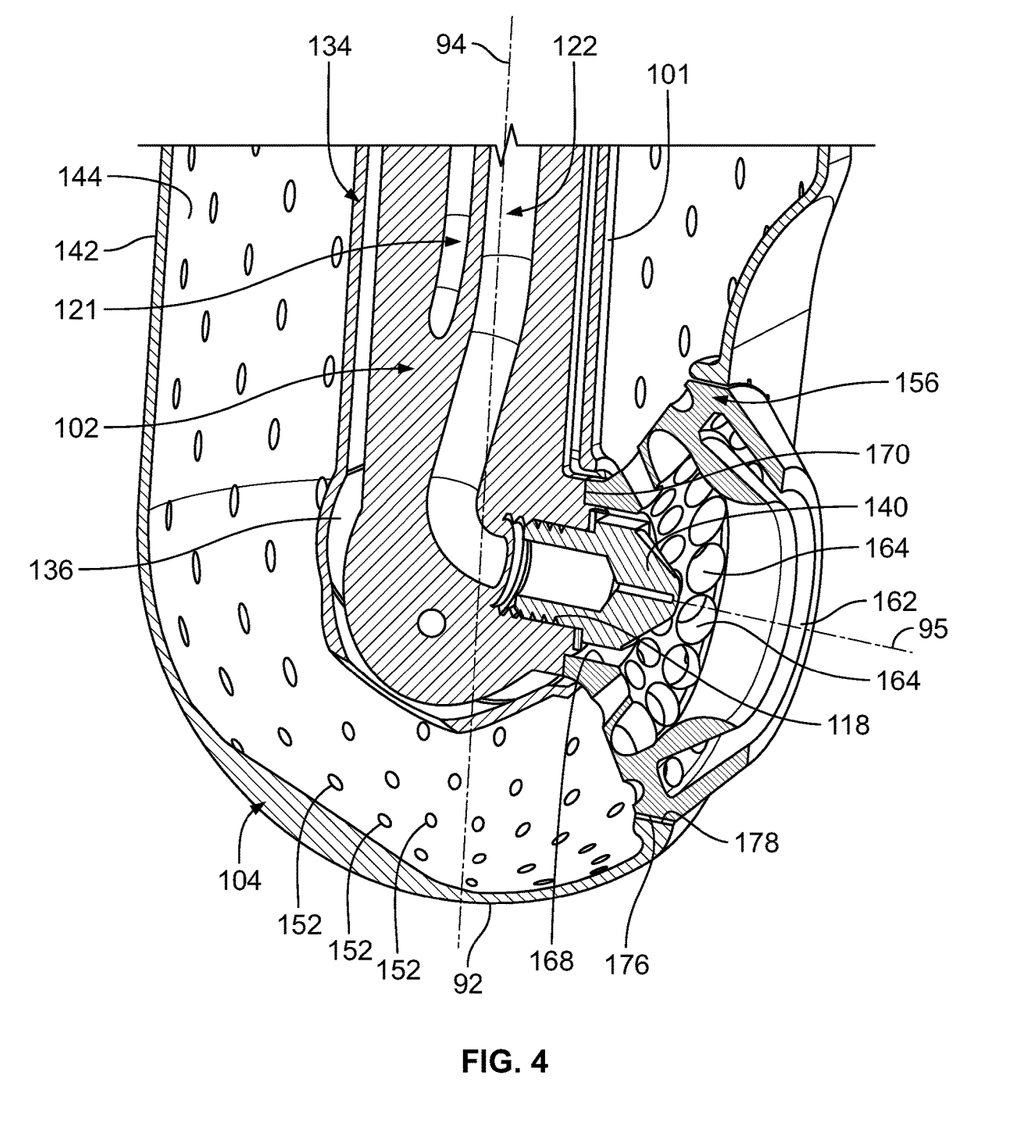
FIG. 4 is a perspective sectional view of the injector module of FIG. 2.
Figure 5:
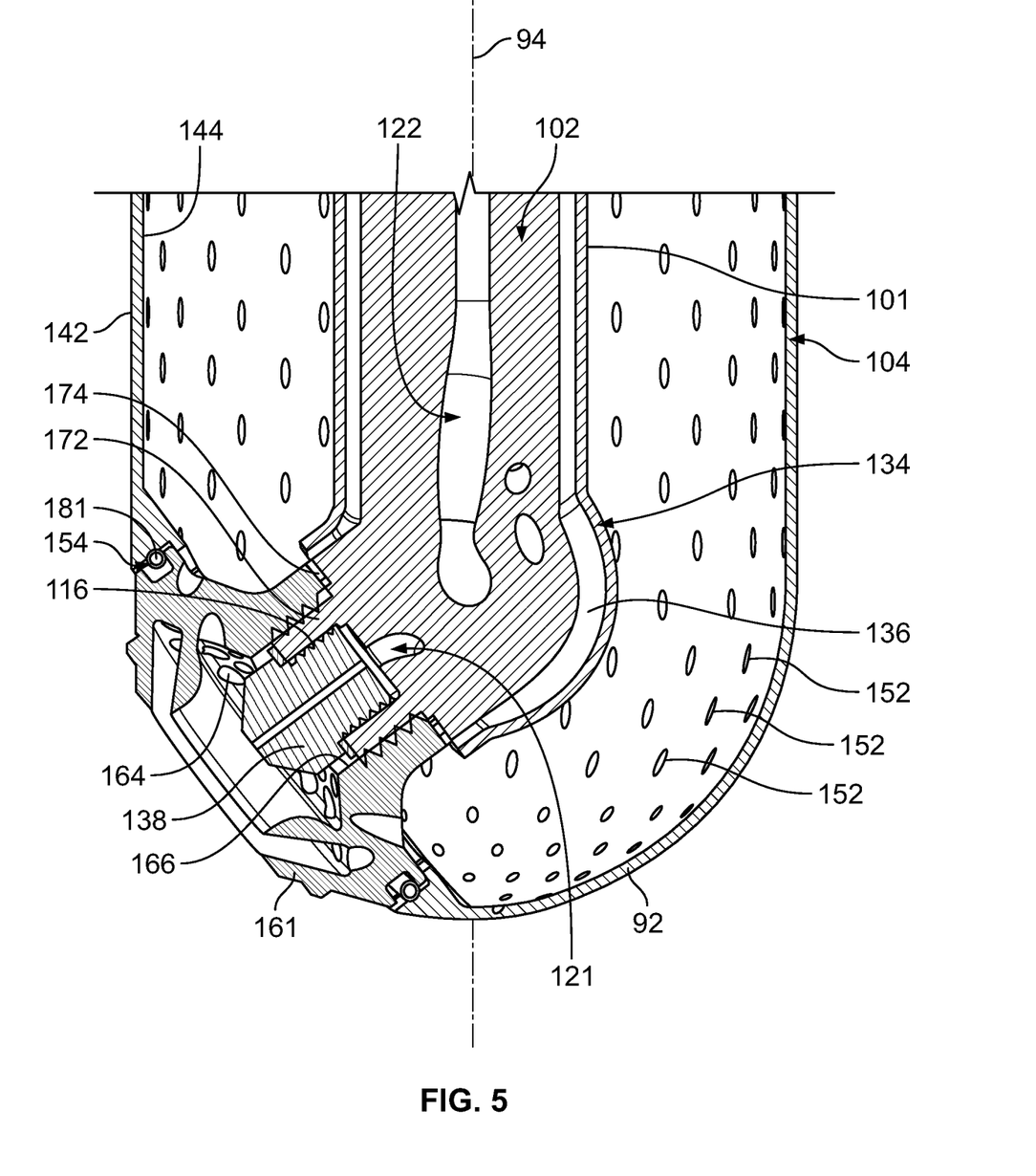
FIG. 5 is a cross-sectional view of the injector module of FIG. 2.

Moreover, as shown in FIGS. 4 and 5, the stem 102 may include a heat shield 134. The heat shield 134 may be defined by a gap 136 (i.e., a heat shield gap) that is offset in an inboard direction from the exterior surface 101. The gap 136 may extend about and jacket a majority of the stem 102 so as to jacket the first and second fuel lines 121, 122. Also, as shown in FIGS. 4 and 5, the gap 136 may be open proximate the outlet end 92 so as to encircle the first stem outlet 116 (FIG. 5) and the second stem outlet 118 (FIG. 4). The gap 136 may insulate and protect the fuel within the fuel lines 121, 122 from external heat.

The shroud 104 of the injector module 42 may be hollow and cup-shaped. The shroud 104 may include an exterior surface 142, an internal surface 144, an upper rim 146, and a bottom end 148. The upper rim 146 may be circular and its diameter may be slightly less than that of the injector opening 43 (FIG. 1) to be received therein. The bottom end 148 may be rounded (e.g., semi-spherical). The majority of the exterior surface 142 and internal surface 144 may be rounded and contoured, but the shroud 104 may include a substantially flat face 150 on one side. The shroud 104 may include an array (a plurality) of effusion cooling holes 152 extending through the wall thickness of the shroud 104 between the exterior surface 142 and the internal surface 144. The effusion cooling holes 152 may extend at non-perpendicular angles relative to the exterior and internal surfaces 142, 144 for directing film cooling air therethrough. The shroud 104 may further include a first opening 154 for the first stem outlet 116 and a second opening 156 for the second stem outlet 118. The first and second openings 154, 156 may be round (e.g., circular) holes extending through the wall thickness of the shroud 104. The second opening 156 may be included on the flat face 150 of the shroud 104, whereas the first opening 154 may be angularly spaced therefrom with respect to the axis 94 and may extend through the bottom end 148.

The shroud 104 may be attached to the stem 102 via the shroud support structures 114. More specifically, the upper rim 146 may receive the shroud support structures 114 with pins 153 (FIG. 3) attaching the shroud 104 to the stem 102. As such, the shroud 104 may receive the stem 102 (at the outlet end 92) and may be spaced in an outboard direction therefrom.

The injector module 42 may further include a first swirler 161 and a second swirler 162. The first and second swirlers 161, 162 may be rounded and disc-shaped. The first swirler 161 may include a central hole 166 (FIG. 5) that receives the first nozzle member 138, and the second swirler 162 may include a central hole 168 (FIG. 4) that receives the second nozzle member 140 (FIG. 5). Also, the first and second swirlers 161, 162 may include a plurality of swirler holes 164 (FIGS. 4 and 5) extending therethrough and arrayed around the respective central hole 166, 168.

As shown in FIGS. 3 and 4, the second swirler 162 may abut and mate to a circular, flat seat 170 surrounding the second stem outlet 118. In some embodiments, the second swirler 162 may be welded or brazed to the seat 170; however, the second swirler 162 may be attached via fasteners, etc. in other embodiments.

As shown in FIGS. 3 and 5, the first swirler 161 may threadably attached to a cylindrical projection 172 that surrounds the first stem outlet 116. There may be a sealing ring 174 between mating faces of the swirler 161 and stem 102 as well.

Additionally, with the shroud 104 attached to the stem 102, the first and second swirlers 161, 162 may be received in the first and second openings 154, 156, respectively. As shown in FIG. 4, the second swirler 162 may include an outer diameter area 176 that opposes an inner diameter area 178 of the second opening 156. In some embodiments, this interface may be formed with precision and with corresponding dimensions. More specifically, the outer and inner diameter areas 176, 178 may have substantially equal diameters (i.e., a so-called "line-to-line" interface that falls within reasonable manufacturing tolerances). As such, the areas 176, 178 may fit closely without further attachment therebetween. In additional embodiments, the outer and inner diameter areas 176, 178 may be welded or brazed together, thereby sealing the joint. This joint may also be configured to account for differences in thermal expansion between the swirler 162 and the shroud 104 during operation. The first swirler 161 may be attached to the shroud 104 differently. For example, as shown in FIG. 5, there may be a resilient sealing ring 181 included between the outer diameter surface of the first swirler 161 and the inner diameter surface of the first opening 154.

Operations of the injector module 42 will now be discussed. As stated, the injector module 42 may define the first fuel circuit 131 and the second fuel circuit 132. These fuel circuits 131, 132 may be fluidly independent (i.e., fluidly disconnected) through the injector module 42 with separate and distinct inputs and outputs. Also, fuel injection may be selectively provided independently from the fuel circuits 131, 132 into the chamber 40 as will be discussed.

To inject fuel via the first fuel circuit 131, fuel may flow from the source 80 to be received by the first inlet branch 110 and routed through the first fuel line 121 (FIGS. 5 and 6) to the first nozzle member 138 in the first stem outlet 116. The first swirler 161 may swirl the atomized fuel and air mixture further into the chamber 40. Also, due to the orientation of the nozzle member 138, the injector module 42 may inject fuel in a substantially tangential direction within the combustion chamber 40 relative to the axis 31 and slightly toward the dome 46.

Furthermore, to inject fuel via the second fuel circuit 132, fuel may flow from the source 80 to be received by the second inlet branch 112 and routed through the second fuel line 122 (FIGS. 4 and 6) to the second nozzle member 140 in the second stem outlet 118. The second swirler 162 may swirl the atomized fuel and air mixture further into the chamber 40. Also, due to the orientation of the nozzle member 140, the injector module 42 may inject fuel in a longitudinal, rearward direction within the combustion chamber 40 along the axis 31 and toward the downstream end 52.

The control system 82 may control and regulate fuel injection via the first and second fuel circuits 131, 132. In this regard, embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure During operation of the combustion system 22, the control system 82 may receive sensor input from one or more sensors 192. The sensors 192 may be of any suitable type and may detect any one of a number of parameters relating to operation of the engine 20 (e.g., operating speed of the engine 20, altitude, etc.). The control system 82 may operate the injector module 42 according to the sensor input from the sensor 192 in some embodiments. Also, in some embodiments, the processor 190 may access the memory device 194 to obtain stored data corresponding to the sensor input and, thus, control injection from the injector module 42 accordingly. Thus, the control system 82 may selectively control fuel injection based at least partly on the detected operating conditions of the engine 20.

Figure 7:
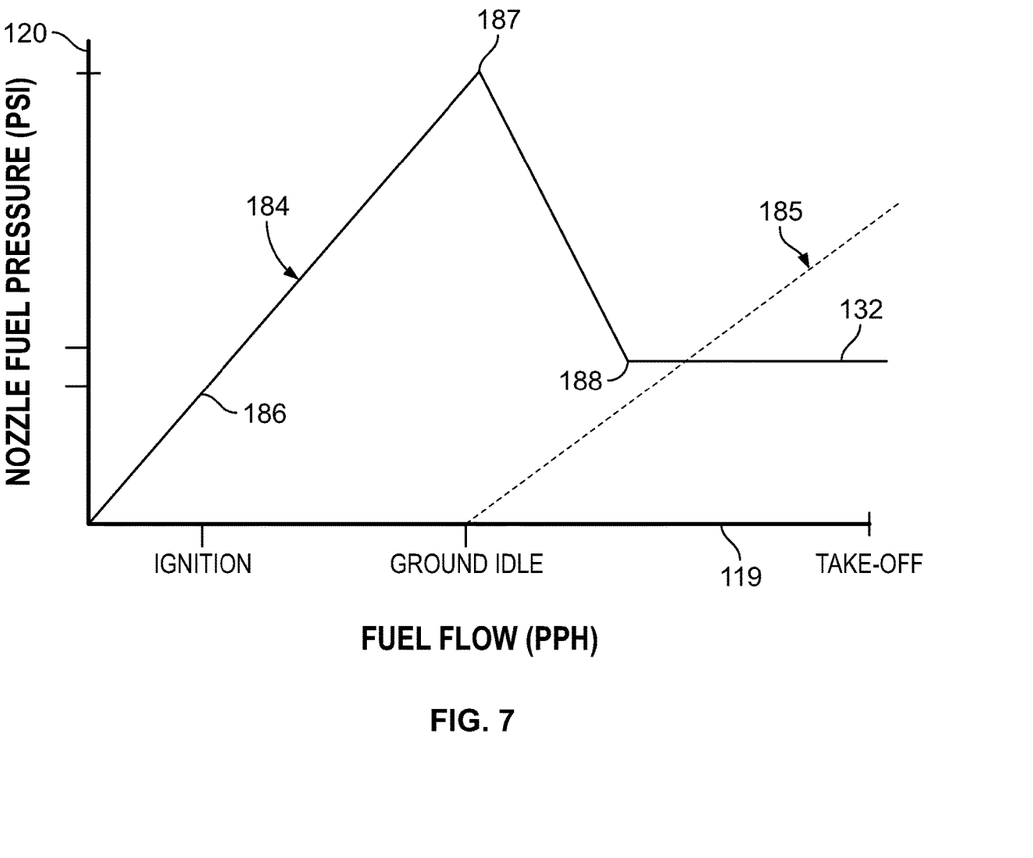
FIG. 7 is a graph illustrating operation of the injector module of FIG. 2 within the gas turbine engine of FIG. 1 according to example embodiments.

More specifically, FIG. 7 graphically illustrates combustion in the combustion chamber 40 of the engine 20 using the injector module 42 at various operating conditions according to example embodiments. Fuel pressure is indicated along the vertical axis 120 in pounds per square inch, and fuel flow is indicated along the horizontal axis 119 in pounds per hour.

Fuel flow may be divided between the first fuel line 121 and the second fuel line 122. In some embodiments, a flow divider valve (not shown) may sequence operation to divide flow between the two fuel lines 121, 122. Also, the control system 82 may selectively operate the first fuel line 121 and independently operate the second fuel line 122. Accordingly, the first and second fuel lines 121, 122 may inject fuel into the chamber 40 according to different injection profiles. These respective injection profiles of the first and second fuel lines 121, 122 may vary according to those operating conditions of the engine 20.

More specifically, the injection profile of the first fuel line 121 (the first injection profile) may be represented by a curve 184 of FIG. 7, whereas the injection profile of the second fuel line 122 (the second injection profile) may be represented by a curve 185 of FIG. 7. In this example, at start of the engine 20, fuel flow is introduced through the first fuel line 121 as indicated by curve 184. The igniter 44 may be turned on and light-off may occur at point 186. The introduced fuel may be lit by the igniter 44 causing ignition. Speed of the engine 20 increases and fuel flow may be increased to a stable idle state at point 187. During this phase, more than fifty percent of the fuel flow may be through the first fuel line 121, and as represented in FIG. 7, the fuel flow may be entirely through the first fuel line 121 (i.e., second fuel line 122 is shut-off). In additional embodiments, a small amount of trickle flow may be delivered through the second fuel line 122 during this phase; however, it will be appreciated that the first fuel line 121 injects more fuel during this phase than the second fuel line 122 in these embodiments. The igniter 44 may be turned off at a threshold speed of the engine 20. Above the idle point 187, fuel flow may be initiated and/or increased through the second fuel line 122 as shown by the curve 185, while it is decreased through the first fuel line 121 as shown by a downward slope of the curve 184. Fuel flow through the first fuel line 121 may be decreased to a minimum level 188 sufficient to keep the flame initiated from the first fuel line 121 from blowing out. The first fuel line 121 may maintain flow at the minimum level 188 onward. For example, at full power of the engine 20, more than fifty percent, and in the exemplary embodiment, approximately ninety percent of the fuel flow may be provided via the second fuel line 122. Also at full power, less than fifty percent of the total fuel flow may be provided through the first fuel line 121, and in the exemplary embodiment, approximately ten percent may be delivered via the first fuel line 121.

It will be appreciated that these injection profiles may vary based on the power conditions of the engine 20. In the embodiments of FIG. 7, the injection profiles of the first and second fuel lines 121, 122 is such that more fuel is injected by the first fuel line 121 than the second fuel line 122 in lower-power operating conditions of the engine, whereas more fuel is injected by the second fuel line 122 than the first fuel line 121 in comparatively higher-power operating conditions.

There may be additional injection profiles that vary, for example, based on the altitude of the aircraft. For example, at higher altitudes in which the engine 20 is in a relatively low-power operating condition, a majority of fuel injection may be provided via the first fuel line 121. In contrast, at lower altitudes in which the engine 20 is in a relatively high-power operating condition, a majority of fuel injection may be provided via the second fuel line 122.

Furthermore, the injection profiles of the first and second fuel lines 121, 122 may vary dependent on whether a START request is received from an auxiliary power unit (APU). If an APU ignition request is received, then the first fuel line 121 may deliver the majority of the fuel into the chamber 40 for starting the APU.

Additionally, the processor 190 may process the sensor input from the sensor 192 to distinguish a high-power operating condition from a comparatively low-power operating condition of the engine 20. The control system 82 may operate the first and second fuel circuits 131, 132 differently in the high- and low-power conditions. The control system 82 may, thus, provide corresponding control signals to the injector module 42 for operation based on these detected operating conditions.

Controlling the injector module 42 according to the methods of the present disclosure may provide substantial benefits. For example, to cold-start an auxiliary power unit (APU), a majority (e.g., all) fuel may be delivered tangentially via the first fuel circuit 131. This tangential injection may provide high operability, for example, at high-altitude operations. In other conditions (e.g., high-power operating conditions of the engine 20), a majority of the fuel may be injected longitudinally via the second fuel circuit 132. This longitudinally-directed injection may provide low-emission operations at high-power operating conditions, thereby providing environmental benefits.

Additionally, the injector module 42 may include a number of features that provide thermal benefits, for example, for allowing the injector module 42 to robustly operate in high temperature environments in a number of operating conditions. For example, the shroud 104 and may shield the stem 102 from high temperature combustion gases in the chamber 40. The array of effusion cooling holes 152 in the shroud 104 may provide film cooling for the injector module 42. Also, the heat shield 134 may thermally insulate the first and second fuel lines 121, 122 within the stem 102.

Moreover, as mentioned above, the first and second fuel lines 121, 122 may be thermally coupled. In some embodiments, the first fuel line 121 may be thermally coupled to the second fuel line 122 to cool the second fuel line 122 at one or more operating conditions of the engine 20. In other words, the first fuel line 121 may be thermally coupled as a heat sink to the second fuel line 122 in at least one operating condition of the engine 20. For example, in some operating conditions discussed above, the first fuel circuit 131 may inject fuel while the second fuel circuit 132 remains shut-off. In these conditions, fuel flowing through the first fuel circuit 131 may receive heat from (i.e., cool) fuel residing within the second fuel circuit 132. Accordingly, coking within the second fuel circuit 132 is less likely.

Figure 6:
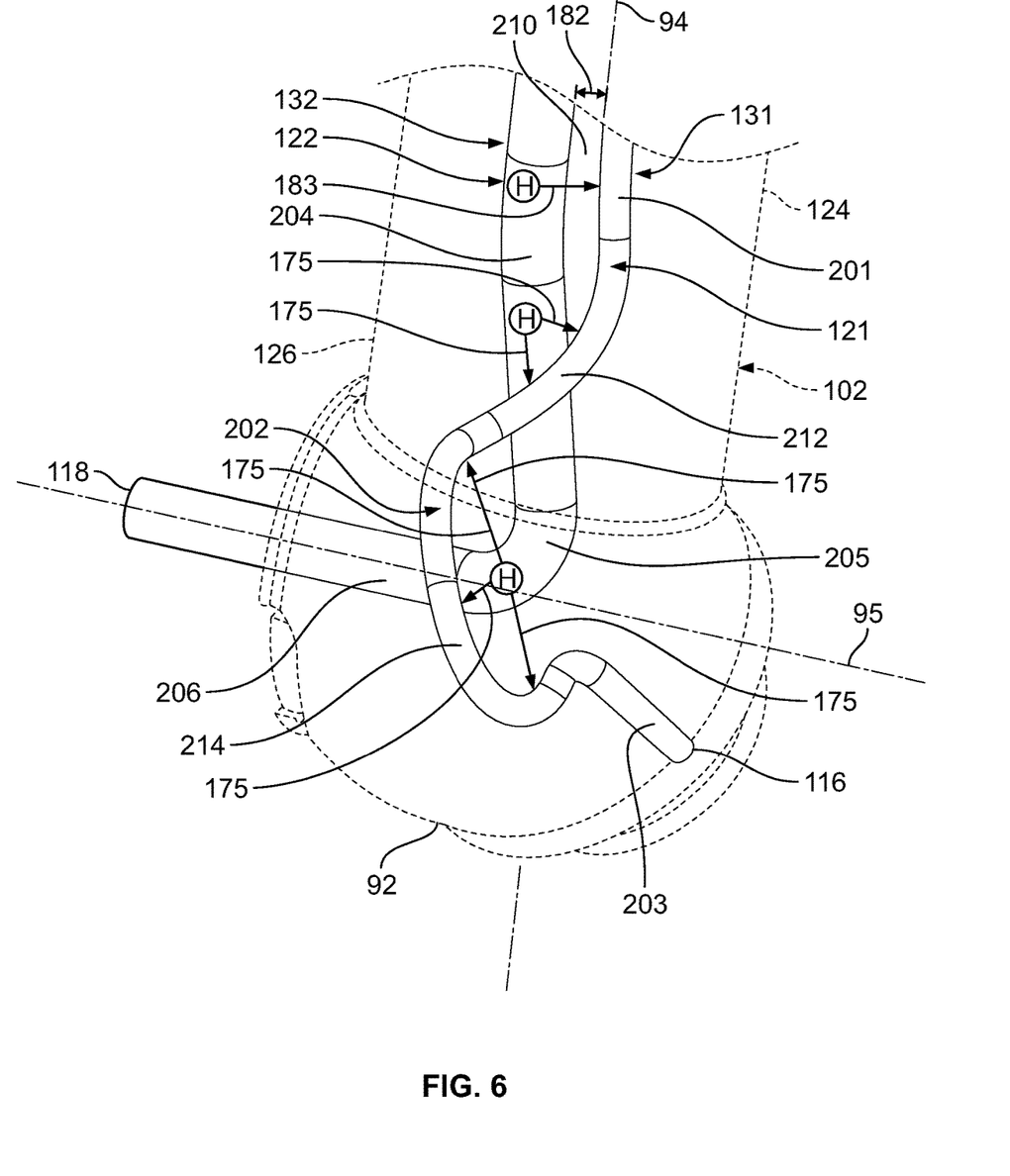
FIG. 6 is a perspective view of fuel lines of the injector module of FIG. 2.

In some embodiments represented in FIG. 6, the first fuel line 121 may include a first longitudinal segment 201, a wrap segment 202, and an outlet segment 203. The first longitudinal segment 201 may be axially straight and may extend along the injector longitudinal axis 94 from the first inlet branch 110 (FIGS. 2 and 3) to the wrap segment 202 (FIG. 6). The first longitudinal segment 201 may be disposed closer to the forward side 124 of the stem 102 than the aft side 126 as it extends along the axis 94. Also, the wrap segment 202 may be axially curved and may wrap about the bulbous portion of the stem 102, proximate the outlet end 92. The wrap segment 202 may curve from the forward side 124 to the aft side 126 and back toward the outlet segment 203. The outlet segment 203 may be axially straight and aligned with the first stem outlet 116.

Additionally, in some embodiments, the second fuel line 122 may include a second longitudinal segment 204, a turn 205, and an outlet segment 206. The second longitudinal segment 204 may be axially straight and may extend along the injector longitudinal axis 94 from the second inlet branch 112 to the turn 205. The second longitudinal segment 204 may be disposed closer to the aft side 126 of the stem 102 than the forward side 124. Also, the turn 205 may be an approximately ninety degree (90°) contour that bends normal to the axis 94, toward the axially straight outlet segment 206 and toward the second stem outlet 118.

The first and second longitudinal segments 201, 204 may both extend substantially parallel to each other and may be separated on opposite sides of the axis 94 by an interior barrier 210 (FIG. 6). The interior barrier 210 may have a relatively small thickness 182 such that the first and second longitudinal segments 201, 204 are in close proximity. The material of the stem 102 (e.g., metallic material) may have relatively high thermal conductivity. Thus, the first and second longitudinal segments 201, 204 may be thermally coupled together. Heat (indicated schematically as "H" in FIG. 6) may transfer, for example, from the second fuel line 122 to the first fuel line 121 via the interior barrier 210 as indicated schematically by arrows 183 in FIG. 6.

Furthermore, the wrap segment 202 may extend about the second fuel line 122. At least part of the wrap segment 202 may wrap and extend about the turn 205. In some embodiments, the wrap segment 202 may include a helical part 212 that extends from the longitudinal segment 201 and helically about the second fuel line 122 proximate (upstream) to the turn 205. The helical part 212 may wrap and helically extend the first fuel line 121 from the forward side 124 to the aft side 126 of the stem 102 as well. The wrap segment 202 may also include a looping part 214 that extends from the helical part 212 and that wraps and arcuately loops about the turn 205 of the second fuel line 122. The looping part 214 may be semi-circular and may lie substantially within a plane, thereby wrapping from the top side of the turn 205 to the bottom side of the turn 205 proximate the outlet end 92. The looping part 214 may arcuately extend at least one-hundred-eighty degrees (180°) about the second fuel line 122. The looping part 214 may also extend generally from the aft side 126 toward the forward side 124 to connect to the outlet segment 203 and the first stem outlet 116. Thus, the wrap segment 202 may wrap around to thermally couple to the second fuel line 122. The close proximity of the lines 121, 122, and the wrapped arrangement increases surface area exposure of the first fuel line 121 to the second fuel line 122. Thus, heat (indicated schematically as "H" in FIG. 6) may transfer, for example, from the second fuel line 122 to the wrap segment 202 as indicated schematically by arrows 175 in FIG. 6.

Because of this thermal coupling, fuel within the first fuel line 121 may readily receive heat from the fuel in the second fuel line 122 (i.e., the first fuel line 121 may be a heat sink for the second fuel line 122). Thus, in conditions where fuel flow through the first fuel line 121 is higher than that of the second fuel line 122 (e.g., up until point 187 FIG. 7), fuel in the first fuel line 121 may effectively cool fuel in the second fuel line 122. This may be effective, for example, in high-power conditions where fuel is injected via the first fuel line 121 and fuel flow is shut-off via the second fuel line 122. As such, the engine 20 may provide high performance, produce less emissions, and the injector module 42 may robustly operate in a number of operating conditions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An injector module for a combustion section of a gas turbine engine comprising:
an injector stem that extends between an inlet end and an outlet end of the injector module, the outlet end comprising a first stem outlet and a second stem outlet;
a first fuel line of a first fuel circuit, the first fuel line having a first longitudinal segment, a wrap segment, and a first outlet segment extending in-series through the injector stem from the inlet end to the outlet end with the wrap segment disposed between the first longitudinal segment and the first outlet segment;
wherein the wrap segment includes a first part and a second part, the first part is disposed between the first longitudinal segment and the second part, the first outlet segment is straight and connected to the first stem outlet, and an axis of the first outlet segment is transverse to an axis of the first longitudinal segment with a first angle;
a second fuel line of a second fuel circuit, the second fuel line having a second longitudinal segment, a turn, and a second outlet segment extending in-series through the injector stem from the inlet end to the outlet end with the turn disposed between the second longitudinal segment and the second outlet segment;

wherein the second outlet segment is straight and connected to the second stem outlet, and an axis of the second outlet segment is transverse to an axis of the second longitudinal segment with a second angle different from the first angle;

the wrap segment of the first fuel line being thermally coupled to the second fuel line, and the first part of the wrap segment extending helically about the second longitudinal segment, and the second part of the wrap segment arcuately curving about the second outlet segment within a plane that is transverse to the axis of the second outlet segment.

2. The injector module of claim 1, wherein the first longitudinal segment and the second longitudinal segment are separated by an interior barrier wall of the injector stem, the interior barrier wall thermally coupling the first longitudinal segment and the second longitudinal segment.

3. The injector module of claim 1, wherein the second part of the wrap segment arcuately curves about the second outlet segment at least one-hundred-eighty degrees (180°).

4. The injector module of claim 1, further comprising an injection control system with a processor and a sensor, the sensor configured to detect a first power operating condition of the gas turbine engine, the processor configured to control injection from the injector module via controlling at least one of the first fuel circuit and the second fuel circuit, when the sensor detects the first power operating condition, injecting more fuel from the first fuel circuit than the second fuel circuit; and wherein the first fuel line is thermally coupled as a heat sink to the second fuel line.

5. The injector module of claim 4, wherein the sensor is configured to further detect a second power operating condition of the gas turbine engine, wherein the first power operating condition is a low power operating condition comparing to the second power operating condition;

wherein, when the sensor detects the first power operating condition, the processor controls the injection from the injector module to inject more fuel from the first fuel circuit by shutting off fuel from the second fuel circuit; and wherein, when the sensor detects the second power operating condition, the processor controls the injection from the injector module to inject fuel from the second fuel circuit.

6. The injector module of claim 5, wherein the combustion section includes a combustion chamber that extends about an engine axis of the gas turbine engine, the combustion chamber having an upstream end and a downstream end that are separated along the engine axis;

wherein the first stem outlet faces the upstream end of the combustion chamber and the axis of the first outlet segment is to the engine axis; and wherein the second stem outlet faces the downstream end of the combustion chamber.

7. The injector module of claim 1, further comprising a shroud that receives the injector stem, the shroud including a first opening for the first stem outlet and a second opening for the second stem outlet.

8. The injector module of claim 7, further comprising: a first swirler received in the first opening of the shroud; and a second swirler received in the second opening.

9. The injector module of claim 7, wherein the shroud includes a plurality of effusion cooling holes.

10. The injector module of claim 1, wherein the injector stem includes a heat shield gap that jackets at least part of the first fuel line and the second fuel line, the heat shield gap being offset in an inboard direction from an exterior surface of the injector stem.

11. The injector module of claim 10, wherein the injector stem is a unitary, one-piece, monolithic injector stem.

12. The injector module of claim 1, wherein the second part of the wrap section is semi-circular.

13. The injector module of claim 1, wherein the axis of the second outlet segment is normal to the axis of the second longitudinal segment.

14. A gas turbine engine comprising:

a combustion section with a combustion chamber that extends about an engine axis of the gas turbine engine, the combustion chamber having an upstream end and a downstream end that are separated along the engine axis;

an injector module for the combustion section, the injector module comprising:

an injector stem that extends between an inlet end and an outlet end of the injector module, wherein the outlet end comprises a first stem outlet and a second stem outlet;

a first fuel line of a first fuel circuit, the first fuel line having a first longitudinal segment, a wrap segment, and a first outlet segment extending in-series through the injector stem from the inlet end to the outlet end with the wrap segment disposed between the first longitudinal segment and the first outlet segment;

wherein the wrap segment includes a first part and a second part, the first part is disposed between the first longitudinal segment and the second part, the first outlet segment is straight and connected to the first stem outlet, and an axis of the first outlet segment is transverse to an axis of the first longitudinal segment with a first angle;

a second fuel line of a second fuel circuit, the second fuel line having a second longitudinal segment, a turn, and a second outlet segment extending in-series through the injector stem from the inlet end to the outlet end with the turn disposed between the second longitudinal segment and the second outlet segment;

wherein the second outlet segment is straight and connected to the second stem outlet, and an axis of the second outlet segment is transverse to an axis of the second longitudinal segment with a second angle different from the first angle;

the axis of the first outlet segment being tangential to the engine axis, and the first stem outlet facing the upstream end of the combustion chamber, and the second stem outlet facing the downstream end of the combustion chamber;

the wrap segment of the first fuel line being thermally coupled to the second fuel line, the first part of the wrap segment extending helically about the second longitudinal segment, and the second part of the wrap segment arcuately curving about the second outlet segment within a plane that is transverse to the axis of the second outlet segment;

an injection control system with a processor and a sensor, the sensor configured to detect a first power operating condition of the gas turbine engine, the processor configured to control injection from the injector module via controlling at least one of the first fuel circuit and the second fuel circuit, when the sensor detects the first power operating condition, injecting more fuel from the first fuel circuit than the second fuel circuit.

15. The gas turbine engine of claim 14, wherein the second part of the wrap section is semi-circular.

16. The gas turbine engine of claim 14, wherein the axis of the second outlet segment is normal to the axis of the second longitudinal segment.

* * * * *

UNITED STATES PATENT AND TRADEMARK OFFICE
CERTIFICATE OF CORRECTION

PATENT NO. : 11,988,386 B2
APPLICATION NO. : 17/457441
DATED : May 21, 2024
INVENTOR(S) : Duane Peterson et al.

Page 1 of 1

It is certified that error appears in the above-identified patent and that said Letters Patent is hereby corrected as shown below:

In the Claims

Column 13, Line 56 (Claim 6), after "is", insert --tangential--

Signed and Sealed this
Twenty-first Day of January, 2025

Coke Morgan Stewart
*Acting Director of the United States Patent and Trademark Office*